US012261474B2

(12) United States Patent
Monteiro Sales

(10) Patent No.: US 12,261,474 B2
(45) Date of Patent: Mar. 25, 2025

(54) MANAGEMENT METHOD OF AN AUTOMOTIVE ALTERNATOR AND SYSTEM

(71) Applicant: FCA Fiat Chrysler Automóveis Brasil Ltda, Betim (BR)

(72) Inventor: Luís Carlos Monteiro Sales, Belo Horizonte (BR)

(73) Assignee: FCA FIAT CHRYSLER AUTOMÓVEIS BRASIL LTDA, Betim (BR)

( * ) Notice: Subject to any disclaimer, the term of this patent is extended or adjusted under 35 U.S.C. 154(b) by 0 days.

(21) Appl. No.: 18/003,269

(22) PCT Filed: Jun. 16, 2021

(86) PCT No.: PCT/BR2021/050261
§ 371 (c)(1),
(2) Date: Dec. 23, 2022

(87) PCT Pub. No.: WO2021/258172
PCT Pub. Date: Dec. 30, 2021

(65) Prior Publication Data
US 2023/0253817 A1 Aug. 10, 2023

(30) Foreign Application Priority Data
Jun. 22, 2020 (BR) .................. 10 2020 012713-6
Jun. 15, 2021 (BR) .................. 10 2021 011561-0

(51) Int. Cl.
*H02J 7/14* (2006.01)
(52) U.S. Cl.
CPC .................. *H02J 7/1446* (2013.01)
(58) Field of Classification Search
CPC .......... H02J 7/1446; B60W 2510/242; B60W 20/20; B60K 2006/4825; Y02T 10/64; Y02T 10/70
See application file for complete search history.

(56) References Cited

U.S. PATENT DOCUMENTS

| 5,081,365 A * | 1/1992 | Field ................. B60L 58/20 903/946 |
| 6,453,865 B2 * | 9/2002 | Hirose ............... B60W 10/30 307/10.6 |

(Continued)

FOREIGN PATENT DOCUMENTS

| EP | 4156450 A1 * | 3/2023 | .............. B60K 6/48 |
| GB | 2371688 | 7/2002 | |
| WO | WO-2021258172 A1 * | 12/2021 | .............. B60K 6/48 |

OTHER PUBLICATIONS

PCT/BR2021/050261, International Search Report and Written Opinion, Dec. 30, 2021 (8 pages).

*Primary Examiner* — Pedro J Cuevas
(74) *Attorney, Agent, or Firm* — FisherBroyles, LLP; Susan M. Oiler

(57) ABSTRACT

A method and system for managing an automotive alternator are described for a vehicle having an internal combustion engine. The alternator is controlled by an electrical control unit (ECU) designed to facilitate electrical and mechanical coupling of the alternator to a battery. The ECU receives signals from a battery charge sensor to: determine a battery charge level between: BC1 (corresponding to a fully charge condition); BC2 (corresponding to a working charge level); and BC3 (corresponding to a low charge); and acting on the alternator such that: at level BC1, the alternator is disconnected electrically and mechanically; at leve BC3, the alternator is connected electrically and mechanically; and level BC2, the alternator is coupled mechanically when the vehicle movement speed is greater than a predetermined value ($V_{Lim}$) and when the engine is disengaged to change gear, and the alternator is electrically connected when the vehicle is being driven in cut-off mode.

6 Claims, 4 Drawing Sheets

(56) References Cited

U.S. PATENT DOCUMENTS

| | | | | |
|---|---|---|---|---|
| 6,459,980 | B1* | 10/2002 | Tabata | B60L 50/61 |
| | | | | 180/65.245 |
| 6,719,076 | B1* | 4/2004 | Tabata | B60L 50/61 |
| | | | | 903/910 |
| 8,932,179 | B2* | 1/2015 | Banker | B60L 53/51 |
| | | | | 477/185 |
| 9,381,909 | B2* | 7/2016 | Banker | B60W 30/18109 |
| 10,247,265 | B2 | 4/2019 | Sales | |
| 10,384,665 | B1* | 8/2019 | Boyko | B60W 20/00 |
| 10,393,036 | B2* | 8/2019 | Pursifull | B60W 10/06 |
| 10,415,529 | B2* | 9/2019 | Majima | B60W 30/18018 |
| 10,479,343 | B2* | 11/2019 | Frait | B60W 10/113 |
| 10,562,512 | B2* | 2/2020 | Miller | B60W 10/188 |
| 10,604,137 | B2* | 3/2020 | Doering | B60K 6/48 |
| 10,737,679 | B2* | 8/2020 | Frait | B60W 10/08 |
| 10,899,335 | B2* | 1/2021 | Ruybal | B60K 6/26 |
| 10,967,848 | B2* | 4/2021 | Ruybal | B60W 20/40 |
| 11,938,825 | B2* | 3/2024 | Sukhatankar | B60L 50/64 |
| 11,945,312 | B2* | 4/2024 | Golder | F16D 21/00 |
| 2001/0018903 | A1* | 9/2001 | Hirose | B60W 10/30 |
| | | | | 307/10.6 |
| 2013/0296130 | A1* | 11/2013 | Banker | B60L 7/26 |
| | | | | 477/209 |
| 2015/0126328 | A1* | 5/2015 | Banker | B60W 30/18109 |
| | | | | 180/65.265 |
| 2018/0030908 | A1* | 2/2018 | Pursifull | F02D 35/023 |
| 2018/0118184 | A1* | 5/2018 | Ruybal | B60W 10/113 |
| 2018/0118185 | A1* | 5/2018 | Frait | B60K 6/387 |
| 2018/0118190 | A1* | 5/2018 | Ruybal | B60W 20/15 |
| 2018/0118196 | A1* | 5/2018 | Doering | B60W 30/18109 |
| 2018/0119801 | A1* | 5/2018 | Frait | B60W 10/08 |
| 2018/0119808 | A1* | 5/2018 | Miller | B60W 20/15 |
| 2018/0202408 | A1* | 7/2018 | Majima | F02N 11/0837 |
| 2022/0105793 | A1* | 4/2022 | Sukhatankar | B60K 6/48 |
| 2022/0118844 | A1* | 4/2022 | Golder | B60K 6/383 |
| 2023/0150502 | A1* | 5/2023 | Dickson | B60W 50/14 |
| | | | | 701/95 |
| 2023/0253817 | A1* | 8/2023 | Monteiro Sales | B60W 10/08 |
| | | | | 322/29 |
| 2024/0227535 | A1* | 7/2024 | Stoltz | B60L 58/21 |

* cited by examiner

MANAGEMENT METHOD OF AN AUTOMOTIVE ALTERNATOR AND SYSTEM

The present invention relates to a method and a system for managing an automotive alternator and, more specifically, a method for managing an alternator capable of being coupled and uncoupled, electrically and/or mechanically, to an Internal Combustion Engine (ICE), or similar. More particularly, the present invention is intended to manage the selective coupling or uncoupling of the alternator depending on the condition of the battery, combined with the driving conditions of the vehicle.

BACKGROUND OF THE INVENTION

The systems for generating vehicular electrical energy, as known in the art, as a rule, comprise an electrical machine, responsible for the production of electrical energy, driven by the vehicle's engine at the time of ignition, through a synchronization belt. The alternator supplies all electrical devices during vehicle operation and recharges the battery, and its designation is a reference to the type of current produced. This device works according to the fundamentals of electromagnetic induction: electric current flows through the rotor creating a magnetic field that induces the movement of electrons in the stator coils, resulting in an alternating current. As automobiles operate with direct current, automotive alternators also include two fundamental components: the rectifier device (or, simply, rectifier), which transforms alternating current into direct current, and the voltage regulator, responsible for controlling the voltage produced.

However, and despite the widespread use of these electric machines in vehicles, they contribute to fuel consumption and carbon dioxide ($CO_2$) emissions, since they represent a consuming source of mechanical energy from the crankshaft shaft. As the mechanical energy of the engine is obtained from the thermal energy arising from the burning of fuel, the alternator acts as a load on the system, which, when the battery is charging, induces an increase in fuel consumption in order to compensate the energy used by the alternator. Furthermore, even with the battery at an adequate charge level (charge amount), the alternator continues to consume mechanical energy from the crankshaft shaft due to the need to electrically supply vehicle systems, which are more and more complex and, therefore, consume more and more electrical energy.

Fuel consumption and carbon dioxide emissions represent, directly, indicators that make up the determination of the level of energy efficiency of the vehicle. The burning of fuel, especially fossil fuel, produces high concentrations of carbon dioxide ($CO_2$) from combustion. The high levels of carbon dioxide emissions expelled into the atmosphere promote harmful effects on the environment, such as the greenhouse effect and consequent global warming, thus implying the possibility of natural catastrophes (e.g. Tsunamis) and climate changes that influence everyday life generally. In addition, fuel consumption is related to carbon monoxide (CO) and hydrocarbon (HC) emissions, which are proven to be harmful to human health.

To minimize the negative effect of alternators on the vehicle's fuel consumption, some tricks were designed and implemented. Normally, projects are based on increasing the (electrical or mechanical) efficiency of the alternator, and on the possibility of a strategic operation of the alternator depending on the demand for electrical energy for the battery. Among the most recent developments, it is worth highlighting the so-called "intelligent alternators" (IA), designed to minimize the effect of mechanical loading of the alternator on the crankshaft shaft, based on data collected from the vehicle itself (ECU, for example) by the alternator. Among the alternators equipped with internal control systems, those described in documents DE 19638872 and U.S. Pat. No. 7,816,893 can be cited, wherein strategies are described to, under specific conditions, electrically disconnecting the alternator from the vehicle's electrical loads. This electrical disconnection occurs when the battery has a sufficient charge level to supply the vehicle's electrical system, or when the alternator's operating conditions are inadequate, among other situations. Electrical reconnection is performed when the battery reaches a minimum level of electrical charge and needs to be recharged. In this way, during periods of electrical disconnection of the alternator, the mechanical load on the crankshaft shaft is minimized.

The invention described in document U.S. Pat. No. 10,247,265, authored by the present inventor, relates to an alternator (E/M-S) able to be coupled and/or uncoupled from the crankshaft of a vehicle engine (an ICE, or similar), in which the coupling or mechanical uncoupling is performed, selectively, in a step distinct from the electrical connection or disconnection. The advantages of the described alternator include a reduction in the jolt caused when the electrical and mechanical coupling occurs, as well as a reduction in fuel consumption and therefore the amount of emissions by the vehicle's engine.

Thus, and despite the advantages arising from both the use of the above intelligent alternators and the alternator having distinct electrical and mechanical couplings, subsequent studies led to the development of new management strategies for a vehicle alternator, whereby such advantages can be increased even more.

OBJECTS OF THE INVENTION

Thus, a first object of the present invention is provide a method for managing an alternator capable of being coupled or uncoupled from the crankshaft shaft of a vehicle engine, in order to reduce its load and consequently significantly reduce the jolt, in addition to providing a reduction in fuel consumption, the level of carbon dioxide ($CO_2$) emissions and also other pollutant gas emissions such as carbon monoxide (CO), hydrocarbons (HC) and nitrogen oxides ($NO_x$).

Another object of the present invention is provide a method for managing an alternator designed to promote the selective coupling and uncoupling of the alternator, depending on the battery charge level and depending on the vehicle's driving mode, in combination.

SUMMARY OF THE INVENTION

These and other objects are achieved and satisfied from a method for managing an automotive alternator comprising the steps of:
  determine the battery charge level, between BC1 (corresponding to a fully charged condition of the battery); BC2 (corresponding to a working battery charge level); and BC3 (corresponding to a low battery charge level);
wherein:
  at level BC1, the alternator is kept electrically and mechanically uncoupled;
  at level BC3, the alternator is kept electrically and mechanically coupled; and at level BC2, the alternator is mechanically coupled when the vehicle's displacement speed is greater than a predetermined VLim value and when the ICE engine is disengaged for a gear change, and the alternator is electrically connected when the vehicle is being driven in cut-off mode.

Furthermore, the method also comprises the step of mechanically and electrically uncoupling the alternator when the engine rotation speed is lower than a predetermined limit value RLim.

Similarly, the objects oft he invention are achieved and satisfied also from an automotive alternator management system comprising a vehicle equipped with an ICE engine, wherein the rotation of the crankshaft is transmitted to the alternator through a toothed belt, with said vehicle further comprising a battery for supply the vehicle's electrical system, and a battery charge sensor, said alternator being controlled by an ECU, said ECU being able to promote the mechanical coupling of the alternator with said toothed belt by acting on the pulley, and the electric coupling with said battery, wherein the ECU receives signals from the battery charge sensor in order to:

determine the battery charge level, between BC1 (corresponding to a fully charged condition of the battery); BC2 (corresponding to a working battery charge level); and BC3 (corresponding to a low battery charge level);
and in order to act on the alternator so that:
at level BC1, the alternator is kept electrically and mechanically uncoupled;
at level BC3, the alternator is kept electrically and mechanically coupled; and
at level BC2, the alternator is mechanically coupled when the vehicle's displacement speed is greater than a predetermined VLim value and when the ICE engine is disengaged for a gear change, and the alternator is electrically connected when the vehicle is being driven in cut-off mode.

Furthermore, the system also comprises mechanically and electrically uncoupling the alternator when the engine rotation speed is lower than a predetermined limit value RLim.

BRIEF DESCRIPTION OF THE DRAWINGS

The present invention will be better understood with the detailed description of a preferred embodiment of the invention, which is supported and illustrated by the attached figures, presented for the mere purpose of illustration and guidance, but without limiting the scope of the invention, in which.

DESCRIPTION OF A PREFERRED EMBODIMENT OF THE INVENTION

Figure 1:
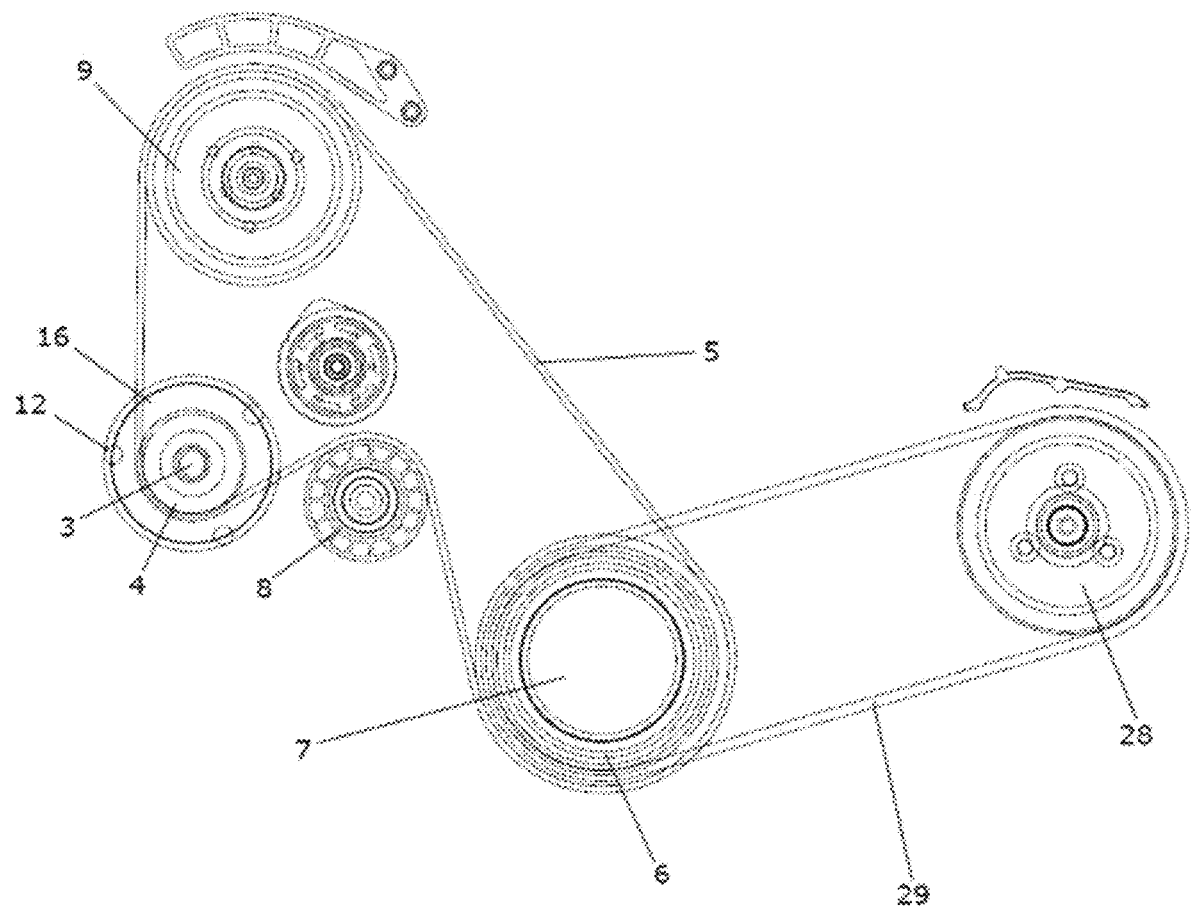
FIG. 1 is a schematic view of the mechanical coupling between the alternator pulley and the crankshaft pulley.
Figure 2:
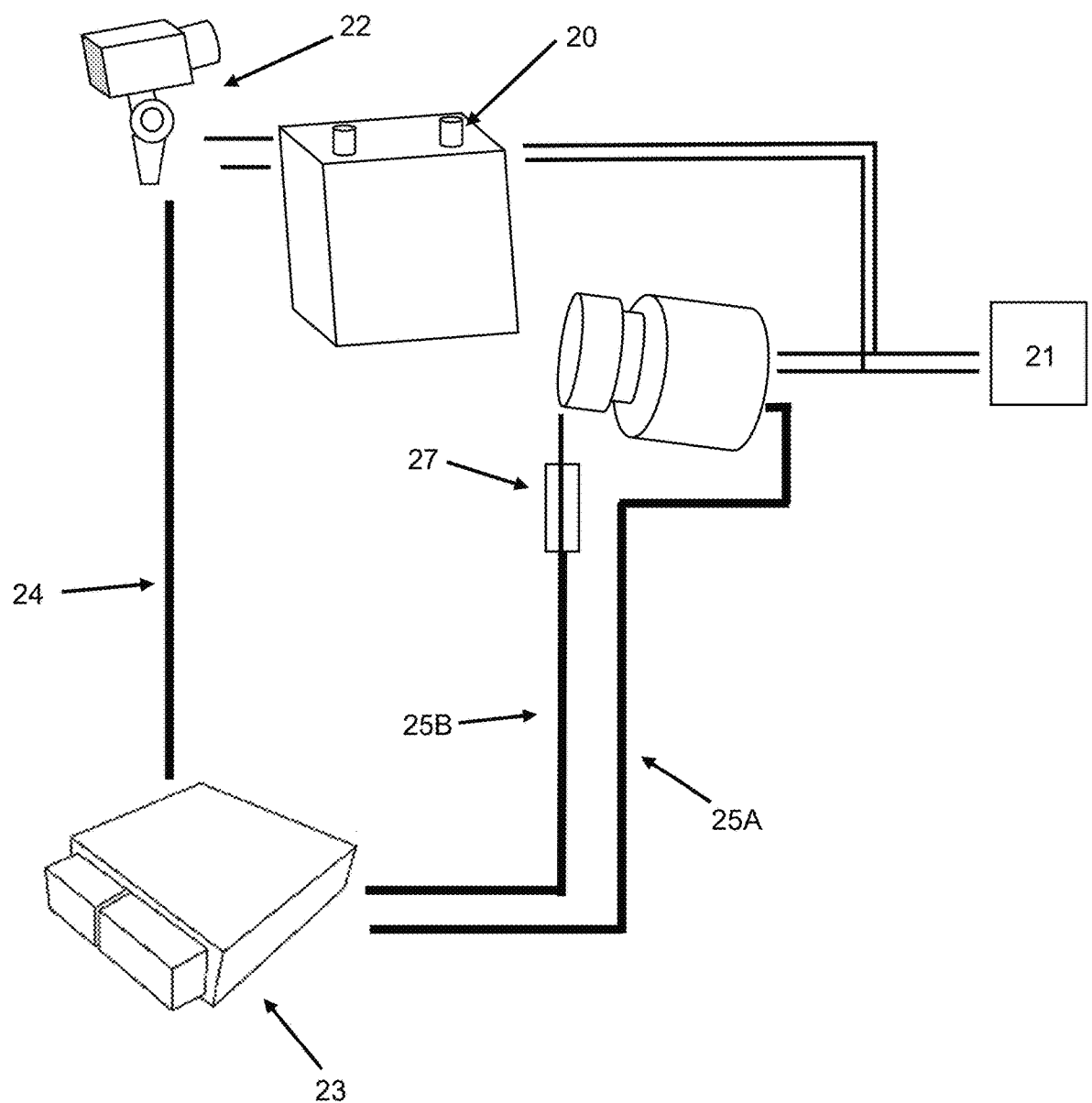
FIG. 2 is a schematic view of the power supply and control systems of an alternator.

According to the attached FIGS. 1 and 2, the numeral 1 indicates an alternator comprising, in a known way, a housing 2, inside which are housed a rotor (not visible) and a stator (not visible) whose relative rotational movement leads to the generation of an electromagnetic field for production of electrical energy. In particular, alternator 1 is an alternator (E/M-C) having selective mechanical coupling and electrical connection system (according to U.S. Pat. No. 10,247,265). Generally speaking, alternator 1 is an alternator capable of being coupled and/or uncoupled from a vehicle's drive system, as well as electrically connected/disconnected from a vehicle's electrical system, independently of each other. In particular, and as is clear to technicians skilled in the art, the advantages of the alternator mentioned above materialize when the mechanical coupling precedes the electrical connection.

While the stator is fixedly mounted in relation to said frame 2, the rotor occupies a central position of the alternator 1 and is supported, with free rotation, around an axis 3, which projects beyond the volume delimited by said frame 2 and which is intended to receive the torque necessary to provide the relative rotational movement between rotor and stator through pulley 4. Also known, a belt 5, usually a toothed belt, engages both pulley 4 and the pulley 6 of the crankshaft 7. Also known, said belt 5 can be engaged with other mechanical devices such as, for example, a tensioner 8 intended to keep the belt 5 tensioned within specific parameters of use, as well as guide pulleys, as idle pulleys (not shown). Likewise, pulley 6 of crankshaft 7 is also responsible for driving other devices on the vehicle, such as, for example, pulley 28 of the power steering pump, through belt 29, or pulley 9 of the air conditioning system.

Regarding to the electrical connections of the system (see FIG. 2), the alternator 1 is electrically connected, in parallel, with the battery 20, and both are connected in order to supply the electrical loads 21 of the vehicle, such as air conditioning system, radio, internal and external lights, etc.

In one embodiment, the battery 20 is further connected to a battery charge state sensor 22, which has the ability to assess the electrical charge stored in the battery cells and provide a signal indicative of this charge to the control unit or ECU 23 through a data line 24.

Generally speaking, the charge of the battery 20 is determined by means of systems and/or devices for determining or detecting the charge of the battery. By way of example, but without limitation, the detection or determination of charge level of the battery 20 can be made from devices or systems such as those described in document WO 2017/027950 of the present applicant, or in documents U.S. Pat. Nos. 8,536,872 or 6,674,266, among others.

For the particular case of alternator 1 being the alternator (E/M-C), according to patent U.S. Pat. No. 10,247,265, the mechanical coupling between shaft 3 and pulley 4 is carried out and intermediated by means of an electromagnetic type clutch 10 capable of coupling and uncoupling shaft 3 in relation to pulley 4. In this case, ECU 23 is still connected to alternator 1 through data line 25A, and to clutch 10 through data line 25B, in order to be capable to command the electrical behavior (connection or disconnection) of alternator 1 and the mechanical behavior of pulley 4, respectively. More particularly, the alternator 1 also comprises, in addition to the electrical connection with the battery 20 and with the electrical loads 21 of the vehicle, a logic connector (not illustrated) which interconnects the voltage regulator (not illustrated) of the alternator 1 with the ECU 23 via line 25A. It should be noted that, according to the logical communication infrastructure of the vehicle in which the system is installed, lines 24 and/or 25A, 25B can be independent lines, as well as being part of a CAN network, or of an Ethernet network, or another network, previously existing in the vehicle.

Figure 3:
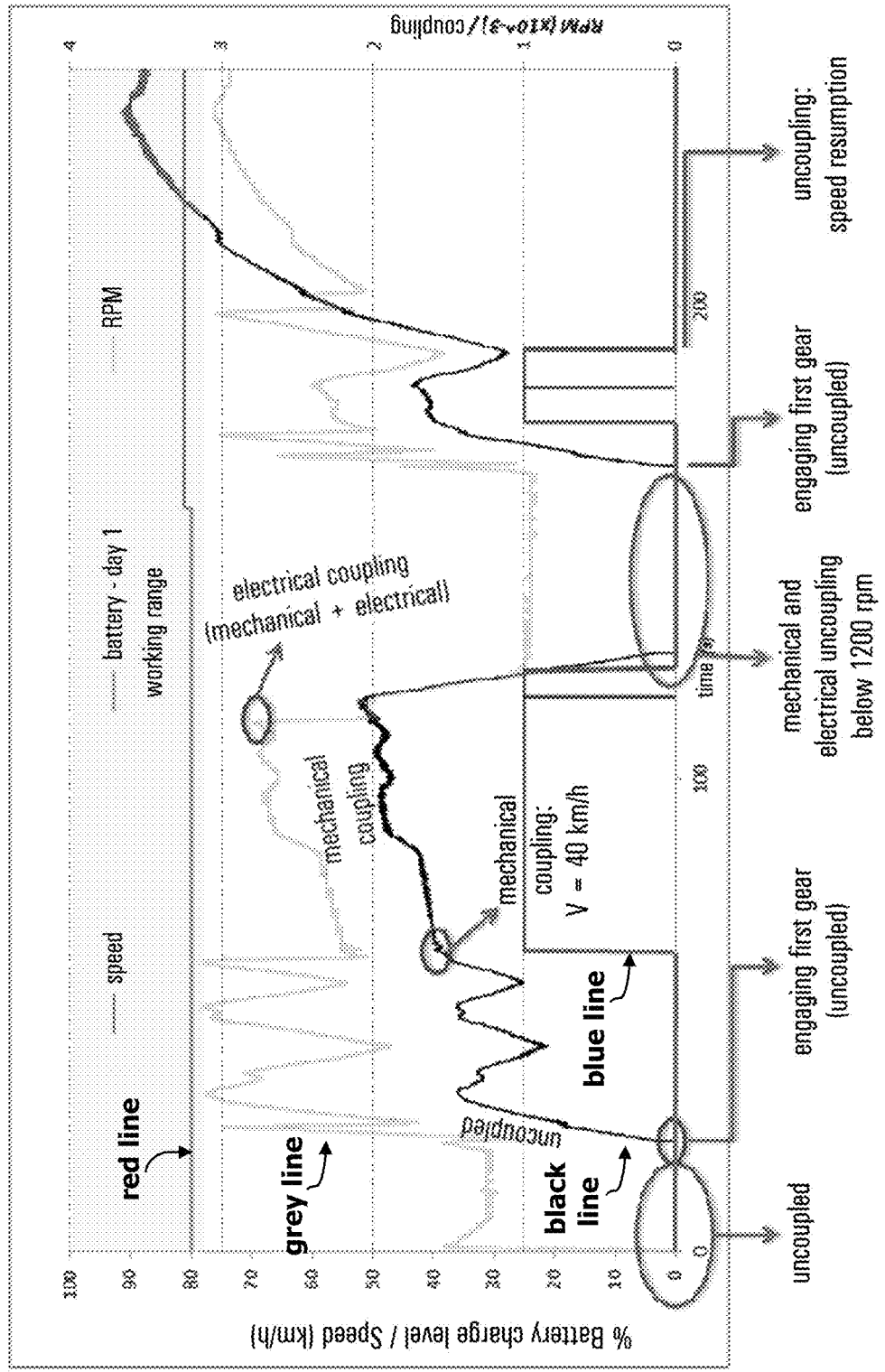
FIG. 3 is a chart illustrating the operating parameters of an ICE as a function of the driving time of a vehicle equipped with a manual transmission, and indicating opportunities for charging the battery.

FIG. 3 is a chart illustrating the method flow according to the invention, in which the coupling and/or the uncoupling of the alternator 1 is a function of the charge level of the battery 20, in combination with the driving conditions of the vehicle.

More specifically, the method of the present invention analyzes and combines battery charge level conditions with vehicle driving in order to indicate an opportune moment for coupling, or for uncoupling, the alternator. The primary focus of the method is to reduce fuel consumption and therefore vehicle emissions. However, and based on an appropriate strategy, as proclaimed, it is also possible to increase the vehicle's driving sensation, selecting the best moments to couple and uncouple the vehicle's alternator. In this way, it is possible to control the coupling of the alternator in order to avoid the "jolt" inherent to the sudden increase of load on the crankshaft of the vehicle's ICE. Specifically, said jolt can be defined as a sudden reduction in the vehicle's displacement speed, due to the sudden increase of load on the crankshaft.

Thus, and initially, it is necessary to establish some operational levels of the battery (20), wherein:

BC1: corresponds to a fully charged condition of the battery—for example, such a full charge level can be defined from a battery charge greater than 99% in relation to the total battery charge level;

BC2: corresponds to a working battery charge level, i.e. a charge sufficient for the vehicle to be driven without risk of compromising the functioning of the electrical system, even in vehicles having several active electrical accessories, in case of impossibility to use the alternator—for example, this working charge level can be defined from a battery charge level between 99% and 75% in relation to the total battery charge level; and BC3: corresponds to a low battery charge level, i.e. an insufficient battery charge level to maintain regular vehicle operation within an estimated period of time—for example, this low charge level can be defined from a battery charge level of less than 75% of the total battery charge level.

It is imperative to highlight that the battery charge level percentages that define the BC1, BC2 and BC3 charge levels are merely illustrative and not limiting. As can be inferred by any technician skilled in the art, the values for the battery charge level percentages may vary depending on the total battery charge level, and the amount and type of equipment that must be supplied by the vehicle's power system, among others.

Thus, the system initially tests the battery charge level condition in order to define the behavior of the alternator 1 (E/M-S) while driving the vehicle.

Thus, when sensor 22 detects that the battery charge level status is at BC1 level, that is, indicating that battery 20 is fully charged, it is not necessary to actuate alternator 1. In this situation, the pulley 4 remains mechanically uncoupled from alternator 1, thus reducing the load on crankshaft 7.

In the complete opposite condition, that is, with battery 20 storing little charge (level BC3), the system understands that it is imperative to restore the battery charge level, so alternator 1 is coupled both mechanically and electrically, whatever the condition of use of the vehicle. This behavior is selected in such a way as to prevent the battery from compromising the power supply to the vehicle's electrical systems. This condition is maintained until the battery charge level reaches at least BC2 charge level. Specifically, the chart in FIG. 3 shows that, as the battery charge level (red curve) is below the "working range" (BC2), the alternator is kept coupled (blue line at level 1) both mechanically and electrically, until the battery charge level returns to that working range.

Finally, and when the load sensor 22 indicates a load condition within the BC2 level, this allows the system to properly manage the performance of alternator 1 in order to reconcile battery recharge with fuel economy and reduction of pollutant emissions.

For this purpose, and as particularly illustrated in FIG. 3, which illustrates an example of parameters controlled by the present system as a function of a route taken by a vehicle, it is possible to define the operating conditions of the present invention.

At time t=0, the vehicle is turned off and alternator 1 is uncoupled both electrically and mechanically in relation to the crankshaft shaft 7. In this way, the engine is started (with increase in rotations according to the grey line in the chart), and this starting is facilitated since the starter motor (not shown) does not need to move the alternator.

After starting the engine and before engaging first gear, the alternator remains mechanically uncoupled from the crankshaft shaft. The driver begins moving the vehicle with the alternator remaining uncoupled—see in particular the black line in the chart, illustrating the vehicle's displacement speed. The speed is increased and the gears are changed consecutively until the vehicle reaches a limit speed VLim, which in FIG. 3 is indicated, for example, as being 40 km/h. From this moment on, the system waits for the next gear change, in which an opportunity is configured to carry out the mechanical coupling of alternator 1. During the period of time in which the driver activates the clutch pedal (vehicle disengaged), and performs the change from a current gear to a consecutive one (wherein this period lasts a few seconds), the system detects this condition and takes the opportunity to carry out the mechanical coupling of alternator 1; the blue line indicates the mechanical coupling condition of the alternator, with level 1 for coupled and level 0 for uncoupled.

It should be noted that the limit speed VLim is preferably a value that varies depending on the "health" of the battery (SoH) and/or the amount of charge (SoC) of the battery. In this way, higher battery charge level values allow the coupling to be postponed, which is reflected in a coupling made at higher speeds VLim; on the other hand, a battery that has already been used for some time (reduced charge storage capacity) requires more constant couplings, which is reflected in a reduction in the limit speed VLim.

At this particular moment, which defines in combination with others the essential characteristics of the invention, the driver of the vehicle does not perceive the mechanical coupling since it occurs with the engine disengaged in relation to the power train. The vehicle maintains its regular displacement, by inertia, and the alternator coupling jolt is only directed towards the engine, but not detectable by the vehicle or the driver.

Once such mechanical coupling of the alternator is performed, the system waits for a second opportunity to finally perform the electrical connection of the alternator. According to the invention, such an opportunity is directed to the moments when the vehicle is driven in cut-off (internal combustion engine rotation maintained by the power train and without using the accelerator pedal), that is, with the vehicle moving down a downward path (acceleration defined exclusively by a component of force of weight), with the engine engaged (one of the gears engaged and with the clutch and accelerator pedal not actuated), as well as with the engine turning at a certain speed (in rpm) above a certain limit. For example, and in the chart of FIG. 3, said limit is established as 1200 rpm.

Thus, and when the cut-off condition is detected, the system takes the opportunity to perform the electrical connection of alternator 1, that is, the rotation of the alternator is performed by the displacement of the vehicle in gear (sequence: wheel, gearbox, engine, alternator), so that the mechanical energy transformed into electricity by the alternator comes exclusively from the "inertial" displacement of the vehicle.

As is clear to a technician skilled in the art, such a condition allows the battery 20 to be charged at "zero cost" in relation to fuel, and with zero pollutant emissions, since in the cut-off condition the fuel injection is disabled. In the chart of FIG. 3, the red line indicates the periods of time in which the alternator is charging the battery (level 1), and the periods in which there is no charging of the battery 20 (level 0).

On the other hand, this form of battery charge is maintained as long as the cut-off condition lasts. The speed limit (rpm) that defines the cut-off condition depends mainly on alternator 1, that is, on its minimum rotation speed that results in significant production of electrical energy, as well as on the characteristics of the ICE that allow it to remain operational within a certain rotational speed, without fuel injection. In other words, for the other vehicle systems to be fully functional (such as the water pump, the oil pump, the air conditioning system, etc.) it is necessary for the engine to be at a certain speed, a speed that, in this case, must be maintained by the displacement of the vehicle.

In this way, once the engine speed drops below this functional limit (RLim), the system provides for the uncoupling of the alternator, both mechanically and electrically. In the chart of FIG. 3, it is possible to identify such moment (with t at about 120 s), when the vehicle speed is reduced from about 50 Km/h until the vehicle comes to a complete stop. At a point on this curve in the chart, around 20 km/h, the engine rotation speed drops below the minimum speed (rpm) limit (RLim), thus promoting the total uncoupling of alternator 1. As the vehicle resumes its movement, the alternator will be coupled again, first mechanically and then electrically, provided that the above conditions are met.

For cases where the vehicles are equipped with automated transmission, the performance of the proposed system is exactly the same, since each gear change is performed after the driver indicates, via actuation on the transmission lever, that a gear change must be performed. Alternatively, vehicles having an automated transmission system can follow the coupling procedure as described below for vehicles having an automatic transmission, since in these automated systems the clutch actuation is performed by an actuator commanded by the TCU, and not by the driver.

In case of a so-called automatic transmission engine, the coupling and uncoupling conditions follow exactly the same the above mentioned parameters. The essential difference, in this case, is that the TCU is the entity that manages each gear change and, therefore, there must be a communication (not illustrated) between the proposed system (that is, between the processor responsible for managing the present system) and the TCU, via CAN network or similar, so that the system of the invention informs the TCU about the need to carry out the coupling, with the TCU informing the system that the vehicle is disengaged.

Figure 4:
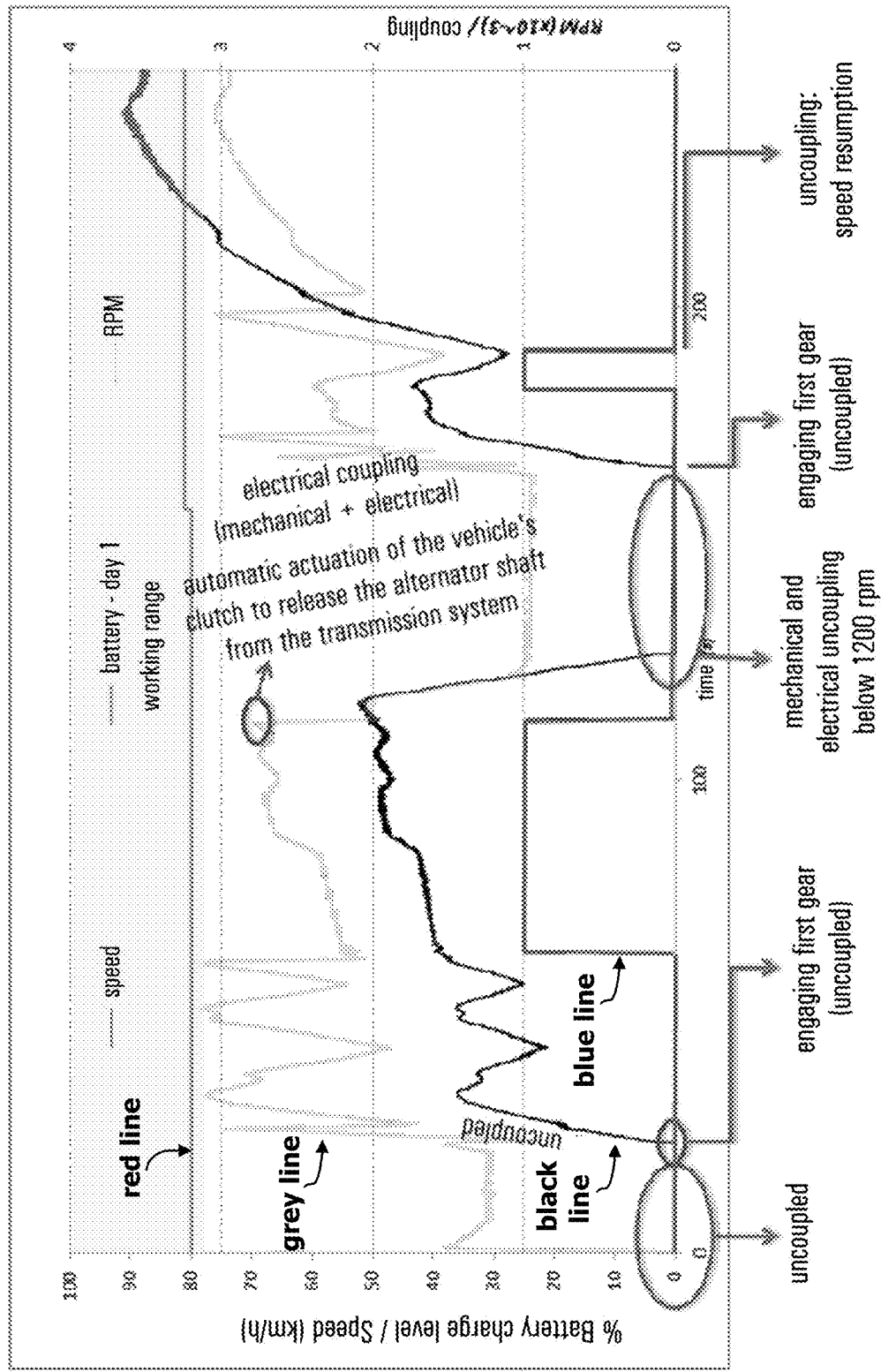
FIG. 4 is a chart illustrating the operating parameters of an ICE depending on the driving time of a vehicle equipped with an automatic or automated transmission, and indicating opportunities for charging the battery.

Alternatively, FIG. 4 illustrates a diversified possibility of actuation of the system of the invention, that is, from a mechanical and electrical coupling in consecutive instants. This is possible, provided both the mechanical and electrical coupling conditions are met (as mentioned above), and based on a delay in the shift time by the TCU, if necessary, since automatic gear changes may require an excessively short time, preventing or compromising the mechanical and/or electrical coupling of the alternator, as it is known.

Alternatively, and even more advantageously for both vehicles having automatic transmission and automated transmission, the mechanical and electrical couplings can be carried out (checking the alternator coupling conditions) already within the cut-off condition and in sequence, for example, with a time gap of a few tenths of a second between each coupling. In this situation, and as the TCU itself controls the transmission clutching (opening moment and duration time), it is possible to condense the mechanical and electrical couplings in time, within the cut-off condition, in order to reduce the rotational load of the alternator on the crankshaft shaft (7) to the maximum.

As a result of both the system and the method proposed by the present invention, it is possible to obtain a reduction in fuel consumption, and therefore in pollutant gas emissions, of the order of 3 to 4% compared to a vehicle whose alternator is of conventional type (always mechanically and electrically coupled to the vehicle), according to tests already carried out by the inventor.

This advantage results, among others, from the following particularities of the proposed system.

Initially, it is possible to start the vehicle engine without the alternator coupled, as well as begin moving the vehicle also without the alternator coupled. Such a scenario reduces the mechanical load on the engine, reducing the need for injected fuel.

Shifting the battery charge periods to the vehicle's cut-off condition leads to battery charging without any fuel consumption, simply taking advantage of the geography of the displacement terrain.

The establishment of the three battery charge levels (BC1, BC2 and BC3), together with the respective specific operational procedures, allows the vehicle to be driven safely, without the risk of a discharge of the battery, which could compromise the electrical systems thereof. It should be noted that, from the system of the invention, the electrical supply of vehicle systems is primarily provided by the battery, and no longer by the alternator, as is the case in the conventional vehicles.

Another advantage of the proposed system is the reduction of engine load, for example, in conditions of more intense power demand. Thus, the alternator can be completely uncoupled if the driver indicates that an overtaking maneuver is to be carried out (accelerator pedal fully compressed and an eventual downshift).

In periods of idling (e.g. stationary or disengaged vehicle) and battery charged within the working regime, the alternator remains uncoupled, thus meaning a considerable reduction in fuel consumption (from 30 to 40%) in this condition.

The invention claimed is:

1. A management method of an automotive alternator operatively connected to a battery and to an electrical control unit (ECU) of an internal combustion engine (ICE), wherein said method comprises:
   determining a battery charge level of the battery, between
      BC1 (corresponding to a fully charged condition of the battery); BC2 (corresponding to a working battery charge level); and BC3 (corresponding to a low battery charge level);

determining a displacement speed of the ICE; and determining a gear change of the ICE; and determining an engine rotation speed;

wherein the electrical control unit is configured for:
  at level BC1, maintaining the alternator in and electrically and mechanically uncoupled state;
  at level BC3, coupling the alternator electrically to the battery and mechanically to a belt operatively driven by the ICE; and
  at level BC2, occurring sequentially is:
    the alternator is mechanically coupled to the belt when (i) the displacement speed of the automotive increases to a value greater than a predetermined value ($V_{Lim}$) after at least one gear change, and (ii) subsequent to the at least one gear change, during the period of time in which the clutch pedal is activated and a consecutive gear change occurs, and
    after the alternator is mechanically coupled to the belt, electrically coupling the alternator to the battery when the vehicle is being driven in cut-off mode and the engine rotation speed is above a predetermined limit value ($R_{Lim}$);
  wherein the cut-off mode maintains rotation of the ICE without using the accelerator pedal.

2. A method according to claim 1, wherein said method further comprises mechanically and electrically uncoupling the alternator when the engine rotation speed is lower than the predetermined limit value ($R_{Lim}$).

3. A method according to claim 1, wherein $V_{Lim}$ varies depending on the health of the battery and/or the amount of charge in the battery.

4. A management system for an automotive alternator, for implementing the method as defined in claim 1, wherein said management system comprises:

a vehicle comprising:
  an internal combustion engine (ICE), in which the rotation of a crankshaft is transmitted to the alternator through a toothed belt,
  a battery operatively connected to an electrical system of the vehicle, and
  a battery charge sensor,
  wherein said alternator is controlled by the ECU and said ECU is configured to promote the mechanical coupling of the alternator with said toothed belt by acting on a pulley, and the electric coupling of the alternator with said battery, wherein the ECU receives signals from the battery charge sensor in order to:
    determine the battery charge level, between BC1 (corresponding to a fully charged condition of the battery); BC2 (corresponding to a working battery charge level); and
    BC3 (corresponding to a low battery charge level);
  and in order to act on the alternator so that:
    at level BC1, the alternator is kept electrically and mechanically uncoupled;
    at level BC3, the alternator is kept electrically and mechanically coupled; and
    at level BC2, the alternator is mechanically coupled when the vehicle's displacement speed is greater than a predetermined value ($V_{Lim}$) and when the engine (ICE) is disengaged for a gear change, and the alternator is electrically connected when the vehicle is being driven in cut-off mode.

5. A system according to claim 4, wherein the ECU uncouples the alternator mechanically and electrically when the engine rotation speed is lower than a predetermined limit value ($R_{Lim}$).

6. A system according to claim 4, wherein $V_{Lim}$ varies depending on the health of the battery and/or the amount of charge in the battery.

* * * * *